(12) United States Patent
Brown et al.

(10) Patent No.: US 6,622,115 B1
(45) Date of Patent: Sep. 16, 2003

(54) MANAGING AN ENVIRONMENT ACCORDING TO ENVIRONMENTAL PREFERENCES RETRIEVED FROM A PERSONAL STORAGE DEVICE

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,162

(22) Filed: Apr. 28, 2000

(51) Int. Cl.[7] ............................................. G05D 23/30
(52) U.S. Cl. ..................................... 702/183; 236/1 C
(58) Field of Search ................................ 702/183, 188, 702/99, 33; 236/1 C, 44 R, 44 A, 91 R, 91 C, 91 D, 91 E, 91 F, 94, 99 A, 99 E; 374/10, 11, 110; 432/36; 700/9, 17, 83, 108, 298, 299

(56) References Cited

U.S. PATENT DOCUMENTS

| | | | |
|---|---|---|---|
| 4,388,616 A | * | 6/1983 | Machida ..................... 340/587 |
| 4,897,798 A | | 1/1990 | Cler |
| 4,916,642 A | | 4/1990 | Kaiser et al. |
| 5,170,935 A | | 12/1992 | Federspiel et al. |
| 5,204,961 A | | 4/1993 | Barlow |
| 5,311,451 A | | 5/1994 | Barrett |
| 5,410,471 A | | 4/1995 | Alyfuku et al. ............. 600/300 |
| 5,544,036 A | | 8/1996 | Brown, Jr. et al. |
| 5,604,800 A | | 2/1997 | Johnson et al. |
| 5,621,662 A | | 4/1997 | Humphries et al. |
| 5,682,949 A | | 11/1997 | Ratcliffe et al. |
| 5,742,920 A | | 4/1998 | Cannuscio et al. |
| 5,751,916 A | | 5/1998 | Kon |
| 5,761,085 A | | 6/1998 | Giorgio |
| 5,793,646 A | | 8/1998 | Hibberd et al. |
| 5,798,945 A | | 8/1998 | Benda |
| 5,848,378 A | | 12/1998 | Shelton et al. ................. 702/3 |
| 5,860,068 A | | 1/1999 | Cook |
| 5,892,690 A | | 4/1999 | Boatman et al. |
| 5,971,597 A | | 10/1999 | Baldwin et al. |
| 6,055,480 A | | 4/2000 | Nevo et al. |
| 6,216,956 B1 | * | 4/2001 | Ehlers et al. ................. 236/47 |

OTHER PUBLICATIONS

Daniel Hays; Best's Review; "Smoke Detectors in Cyberspace"; Jul., 1997.
iButton Overview; ibutton.com/index.html; What is an iButton?.
IECON '98; Michael Pauly; "Monitoring Indoor Environments Using Intelligent Mobile Sensors"; Aug. 31–Sep. 4, 1998.

* cited by examiner

Primary Examiner—Marc S. Hoff
Assistant Examiner—Edward Raymond
(74) Attorney, Agent, or Firm—Marilyn Smith Dawkins; Bracewell & Patterson, L.L.P.

(57) ABSTRACT

According to the present invention, environment indicators computed for a particular environment from among multiple environments are converted into a common transmittable data format. The environment indicators are transmitted in the common transmittable data format to a data processing system, wherein the data processing system has access to a personal storage device proffered by a particular user. An environment sensitivity profile for the particular user associated with the particular environment, is retrieved from the personal storage device to the data processing system. An environment indicator analyzer application executing on the data processing system analyzes the multiple environment indicators received at the data processing system according to the environmental sensitivity profile and determines control signals for adjusting multiple environmental control systems that control the particular environment.

48 Claims, 8 Drawing Sheets

Fig. 3

| Environment Indicator measurement (72) | Date/Time (74) | Measurement unit (76) | Environment zone (77) |
|---|---|---|---|
| 30 | 11/12/2000/06:10:20 | Particles/cubic inch of smoke | Building 30 |
| ... | ... | ... | ... |
| 200 | 11/13/2000/07:15:12 | Particles/cubic inch of smoke | Building 30 |

| Type of measurement to take (82) | Date/Time (84) | Range (86) | Automatic transmission to: (87) | Environment zone (89) |
|---|---|---|---|---|
| ... | ... | ... | ... | ... |
| Carbon monoxide | 11/18/2000/10:00:00 | 00:05:00 | Server A | Lake X |
| Carbon dioxide | 11/18/2000/10:00:00 | 00:01:00 | Server A | Lake Y |
| Pure oxygen | 11/18/2000/10:00:00 | 00:00:30 | Server B | Lake Z |
| ... | ... | ... | ... | ... |

(88) — 80

| User ID{92} | Password{93} | ...{94} | Health restrictions{95} | Output preference{96} |
|---|---|---|---|---|
| GeorgeG | 45ghr5 | ... | No smoke levels greater than 30 particles/cubic inch | Colorblind ready |
| Sylvia | Gen234 | ... | No oxygen levels less than 90% pure oxygen | Large font |
| ... | ... | ... | ... | ... |

| Environmentally sensitive device{97} | Environmental sensitivities{98} | Environment zone{99} |
|---|---|---|
| Machine 1 | Temperature > 90 Humidity > 50% | Zone 1 |
| Machine 2 | Temperature < 60 Humidity < 20% | Zones 1 and 2 |
| ... | ... | ... |

MANAGING AN ENVIRONMENT ACCORDING TO ENVIRONMENTAL PREFERENCES RETRIEVED FROM A PERSONAL STORAGE DEVICE

CROSS-REFERENCE TO RELATED APPLICATIONS

The present application is related to the following applications, which are filed on even date herewith and incorporated herein by reference:

(1) U.S. patent application Ser. No. 09/560,163; and
(2) U.S. patent application Ser. No. 09/560,161.

BACKGROUND OF THE INVENTION

1. Technical Field

The present invention relates in general to an environmental monitoring device and in particular to a method, system and program for monitoring multiple diverse environmental measurement devices. Still more particularly, the present invention relates to a method, system and program for managing a particular environment according to environmental sensitivity preferences designated by a user on a personal storage device.

2. Description of the Related Art

Conventional electronic environmental measurement devices provide for taking measurements that are computed to reflect a portion of the environment such as amounts of smoke, carbon dioxide, carbon monoxide, oxygen, radiation, temperature, wind speed, humidity, etc. that are in a constrained portion of the environment. Environmental measurements can be taken in solids, liquids and gases and in a constrained area or in a non-constrained area. In particular, an electronic environmental measurement device is able to translate a measurement, such as the speed of a propeller driven by the wind, into a numerical output. Numbers computed by calibrated electronic environmental measurement devices are associated with a scale of measurement that has been assigned to that type of environmental measurement. An individual may be able to consult a chart or other documentation to discern the meaning and/or implication of the computed number. For example, a computed wind speed may be compared by an individual with a chart containing advisories based on a range of wind speeds.

While conventional environmental measurement devices provide a computed number that can be utilized by an individual or group to monitor a particular portion of the environment, there is a need for electronically documenting the measured data in a timely manner. In addition, while some electronic environmental measurement devices do provide for electronically documenting the measured data, there is a need to electronically document data from multiple diverse electronic environmental measurement devices such that a comprehensive environmental profile can be determined. For example, while an individual may be able to consult a chart or other textual data to discern the meaning of a number computed by an electronic environmental measurement device, this data is not always available, may not be current, may not provide recommendations for how to respond to particular measurement values, and may not provide analysis of measurements from multiple diverse electronic environmental measurement devices.

Some environmental measurement devices are coupled to a controller that adjusts a particular aspect of a particular environment or process in response to an environmental measurement or in response to a preprogrammed setting. For example, a thermostat detects the air temperature of a controlled environment and when the air temperature rises above a threshold temperature, activates an air conditioner to cool the air in the controlled environment until the detected air temperature is less than the threshold temperature. However, for example, by adjusting the humidity in a particular environment or an air speed, the effectual temperature of the particular environment is adjusted. Unfortunately, the prior art does not provide for controlling a humidifier, an air conditioner and a fan by a single device that also knows the environmental needs of a user or object detected in the environment. In another example, a smart thermostat may be set to decrease the temperature of a room at a particular time, such as in the evening, and then increase the temperature in the room at another time, such as in the morning. However, a thermostat is typically set only for those people living in the house. A smart thermostat does not provide for automatically and temporarily updating the smart thermostat to adjust the temperature of the room where the guest is staying according to the temperature preferences of the guest.

In view of the foregoing, it is desirable that a method, system and program is provided for monitoring multiple diverse electronic environmental measurement devices by applications stored on a single personal storage device in order to store monitored environmental related data over a period of time, assist the user by analyzing the monitored measurements according to environmental sensitivities of people, machines, and other objects within an environment, and control the adjustment of the environment according to variable environmental sensitivities.

SUMMARY OF THE INVENTION

In view of the foregoing, it is therefore an object of the present invention to provide an improved environmental measurement monitoring device.

It is another object of the present invention to provide an improved method, system and program for managing multiple diverse environmental measurement devices.

It is yet another object of the present invention to provide an improved method, system and program for managing a particular environment according to environmental sensitivity preferences designated by a user on a personal storage device.

According to the present invention, environment indicators computed for a particular environment from among multiple environments are converted into a common transmittable data format. The environment indicators are transmitted in the common transmittable data format to a data processing system, wherein the data processing system has access to a personal storage device proffered by a particular user. An environment sensitivity profile for the particular user associated with the particular environment, is retrieved from the personal storage device to the data processing system. An environment indicator analyzer application executing on the data processing system analyzes the multiple environment indicators received at the data processing system according to the environmental sensitivity profile and determines control signals for adjusting multiple environmental control systems that control the particular environment.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 3 depicts a block diagram of a data storage structure for the environment indicator storage in accordance with the method, system and program of the present invention;

FIG. 4 illustrates a block diagram of a data storage structure for the measurement scheduler in accordance with the method, system and program of the present invention;

FIG. 5 depicts a block diagram of a data storage structure for environment profiles in accordance with the method, system and program of the present embodiment;

DETAILED DESCRIPTION OF ILLUSTRATIVE EMBODIMENT

The present invention may be executed in a variety of systems, including a variety of computers under a number of different operating systems where the system has access to a personal storage device. In a preferred embodiment of the present invention, the computer is a desktop computer, a network computer, a midrange computer or a mainframe computer. However, in alternate embodiments, the computer may also be a portable computing system such as a laptop computer, a personal digital assistant, or cellular telephone. In addition, the computer may be a stand-alone system or part of a network such as a local-area network (LAN) or a wide-area network (WAN). The personal storage device may be a smart card, an ibutton™ microprocessor (ibutton is a trademark of Dallas Semiconductors, Inc.), or other portable storage device that stores data for a particular user or users and is easily transportable. Therefore, in general, the present invention is preferably executed in a computing device that performs computing tasks such as manipulating data in a personal storage device that is accessible to the computing device.

Figure 1:
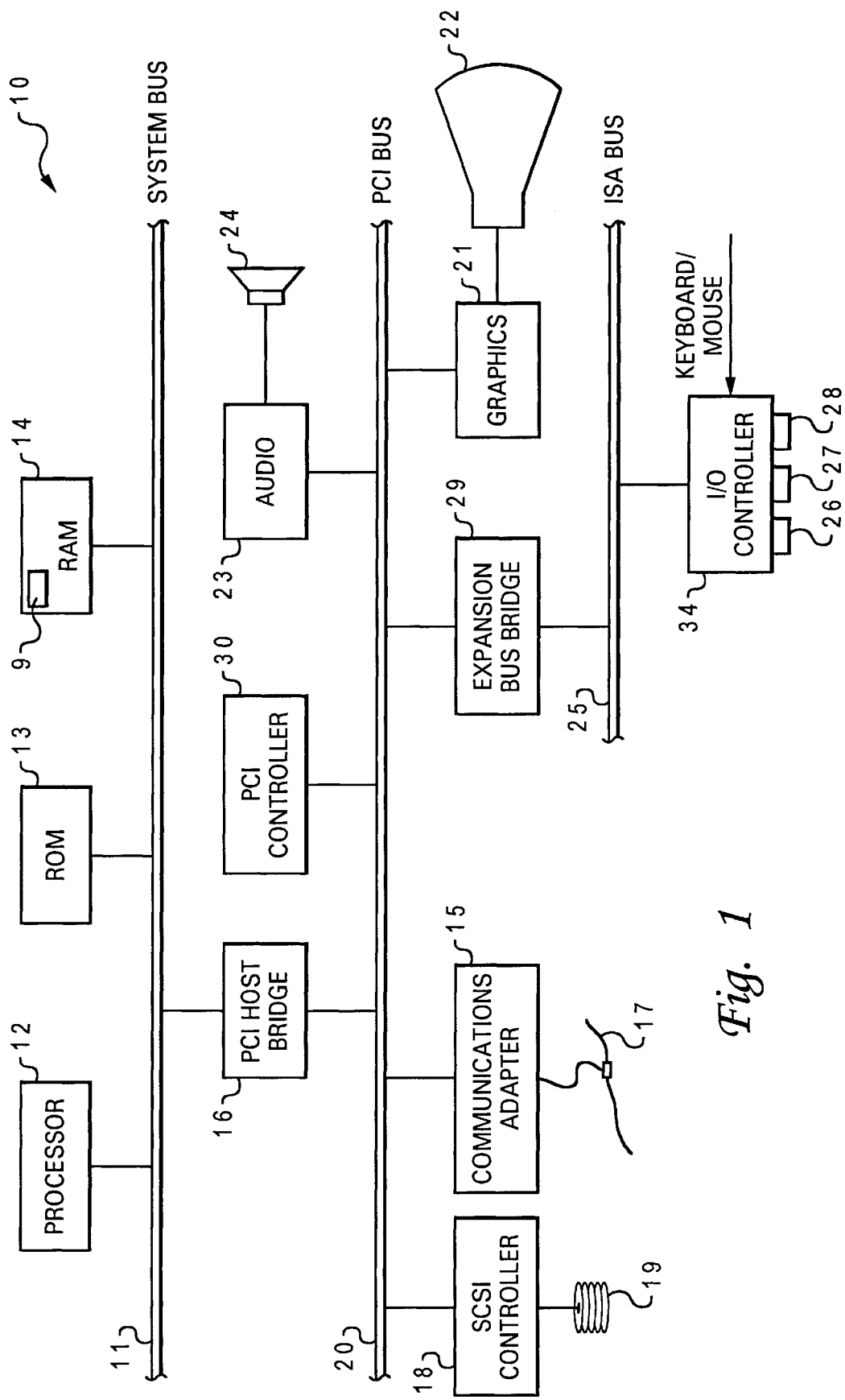
FIG. 1 is a block diagram of a computer system that may utilize a preferred embodiment of the present invention.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 6, 7, 8, 9, and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
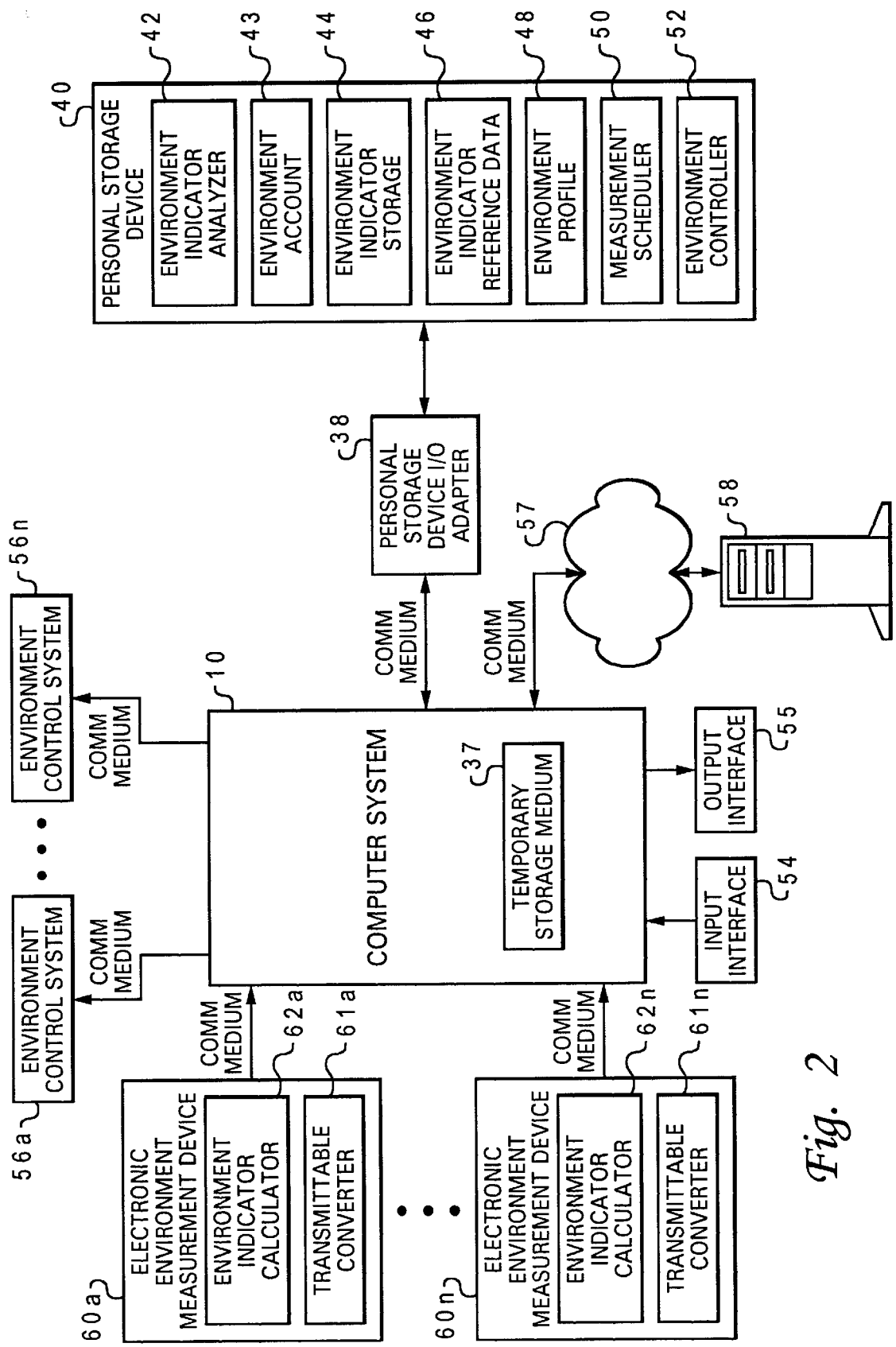
FIG. 2 illustrates a block diagram of one embodiment of an electronic environmental measurement device monitoring system in accordance with the method, system and program of the present invention.

With reference now to FIG. 2, there is illustrated a block diagram of one embodiment of an electronic environmental measurement device monitoring system in accordance with the method, system and program of the present invention. As depicted, computer system 10 communicates with multiple diverse electronic environmental measurement devices 60a–60n via a communications medium (or across a communication interface). In addition, computer system 10 communicates with multiple diverse environmental control systems 56a–56n via a communications medium. Moreover, computer system 10 communicates with a personal storage device adapter 38 that accesses a personal storage device 40 via a communications medium. In addition, computer system 10 may communicate with other data processing systems, such as server 58 via a communications medium comprising a network connection 57.

The communications medium may comprise wired or wireless communications or other communications media that enables transmission of data. Moreover, the communications medium may comprise a network, such as the Internet, or a direct data link. In a wired embodiment of the communications medium, for example, electronic environmental measurement devices 60a–60n and environmental control systems devices 56a–56n are connected to computer system 10 via a wired connection to the parallel, serial, USB ports, or the communications adapter depicted in FIG. 1. In a wireless embodiment of the communications medium, for example, electronic environmental measurement devices 60a–60n and environmental control systems 56a–56n are wirelessly connected to computer system 10 via infrared, passive radio frequency (RF), cellular and other wireless transmissions which are detected by computer system 10.

Data exchange across the communications medium is advantageously performed in at least one of multiple available data transmission protocols and is preferably supported by a common data structure format, such as the extensible mark-up language (XML)data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file, as depicted below, preferably contains data that is distinguished by attributes on elements and may be wrappered within a larger element. The XML data file is intended as an example of elements and data that could be included in an XML data file transmitted from an electronic environmental measurement device that measures pollen in the air. For example, the data attributed to element "<TimeStamp></TimeStamp>" designates the time in seconds since the Epoch, 00:00:00 Jan. 1, 1970 UTC that the pollen count was recorded.

<POLLENCOUNT TimeStamp="888965153"
      TimeRange="888965153,888965158" LatLon="36.58, −121.85"
        Elevation="77" MachineID="123456" LocationName="MONTEREY
      PENINSULA DeviceType="Pollen Meter"
      IPAddress="192.168.1.1" PollenCount="7766">

A second example of the same data in an alternate XML data format that includes elements is illustrated below.

<TimeStamp>888965153</TimeStamp>
    <TimeRange>888965153,888965158</TimeRange>
    <LatLon>36.58, −121.85</LatLon>
    <Elevation>77</Elevation>
    <MachineID>123456</MachineID>
    <LocationName>MONTEREY PENINSULA</LocationName>
    <DeviceType>Pollen Meter</DeviceType>
    <IPAddress>192.168.1.1</IPAddress>
    <PollenCount>7766<PollenCount>

In the examples, an electronic pollen meter takes pollen readings at a particular latitute/longitude of 36.58/−121.85 where numbers are positive for Northern latitudes and Eastern longitudes. In addition, the s elevation in meters above sea level and the time taken are included. Moreover, a machine identifier, name of the location, and Internet Protocol (IP) address are included for further specifying the pollen count taken.

In the example of the XML data format as the common transmittable data structure format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemed, and XSL files may be, for example, transmitted with an XML data file to a receiving system or downloaded at the receiving system from an alternate source.

In the present examples, the DTD or schema would verify that all the data required for an environmental measurement is included in the XML data file. In addition, in the present examples, the XSL file would determine the output capabilities of the receiving system and accordingly filter the presentation of the XML data at the receiving system. For example, the XSL file may translate the XML data into a browser display where the colors, fonts, and-sizes-of the data are determined by the XSL file.

Environmental measurement devices 60a–60n preferably comprise multiple diverse environmental measurement devices, such as a smoke detector, carbon dioxide monitor, humidity monitor, and other monitoring devices that monitor at least one aspect of a controlled environment. While in the present embodiment environmental measurement devices 60a–60n are depicted as external devices from computer system 10, in alternate embodiments, environmental measurement devices 60a–60n may be internally associated with computer system 10 or remotely accessible to computer system 10.

Each of environmental measurement devices 60a–60n preferably comprises a environment indicator calculator 62a–62n. Environment indicator calculators 62a–62n preferably compute a numerical environment indicator of environmental data measured by environmental measurement devices 60a–60n for an environment. In particular, in computing numerical environment indicators, the computed numbers are preferably associated with a scale of measurement that has been assigned to that type of environmental measurement. For example, wind speed is preferably measured in knots or miles/hour.

Environment indicators computed by environment indicator calculators, 62a–62n are preferably converted into a common transmittable data format by transmittable converters 62a–62n, such as XML, and transmitted via the communications medium to computer system 10. While in the present embodiment transmittable converters are depicted as internally accessible to environmental measurement devices 60a–60n, in alternate embodiments transmittable converters 61a–61n may be remotely accessible to environmental measurement devices 60a–60n at, for example, an alternate data translation server.

It is important to note that environmental measurement devices 60a–60n may broadcast environment indicators in the transmittable data format to any device or may selectively transmit the environment indicators to particular data processing systems. In addition, it is important to note that the location of environmental measurement devices 60a–60n may be determined by the position from which environmental measurement devices 60a–60n broadcast or selectively transmit environment indicators. Or alternatively, environmental measurement devices 60a–60n may each be equipped with a global positioning system (GPS) that passively detects a location and transmits that location with the environment indicators.

Computer system 10 preferably includes, but is not limited to including, temporary data storage 37, such as RAM or cache. Personal storage device adapter 38 preferably reads from personal storage device 40 into temporary data storage 37. In addition, personal storage device adapter preferably writes to personal storage device 40. Personal storage device 40 preferably includes, but is not limited to including, a data storage medium, an encryption medium and a processor. In particular, it advantageous for personal storage device adapter 38 to actively detect RF transmissions from personal storage device 40, such that data from personal storage device 40 is proffered without an intentional physical connection of personal storage device 40 with personal storage device adapter 38.

The data storage medium of personal storage device 40 preferably includes, but is not limited to including, an environment indicator analyzer 42, an environment account 43, an environment indicator storage 44, an environment indicator reference 46, an environment profile 48, a measurement scheduler 50, and an environment controller 52. The encryption medium may utilize multiple types of encryption techniques including, but not limited to, double blind encryption is systems, other key-based encryption methods and multi-phase encryption methods.

Data stored on personal storage device 40 is preferably transmittable to temporary storage medium 37 of computer system 10. In particular, environment indicator analyzer 42, measurement scheduler 50, and environment controller 52 are preferably applications that are transmitted to temporary data storage 37 and executed on-computer system 10. For example, environment indicator analyzer 42 may be a java applet executable on computer system 10. Alternatively, for a personal storage device 40 with substantial processing power, environment indicator analyzer 42 may be executed on personal storage device 40, such that computer system 10 are utilized as "dumb" terminals. Moreover, in an alternate embodiment of the invention, computer systems 10 may further comprise environment related applications, such as an environment indicator analyzer application. Furthermore, additional applications may be stored on personal storage device 40 and uploaded to temporary data storage 37 to control additional monitoring functions. In addition, data transmitted to temporary storage medium 37 may be further stored in a non-volatile data storage medium that is accessible to computer system 10. Alternatively, a user may choose to flush temporary storage medium 37 of applications and data proffered by his/her personal storage device 40.

Environment indicators transmitted from environmental measurement devices 60a–60n to computer system 10 are preferably automatically stored in environment indicator storage 44 of personal storage device 40. Environment indicator storage 44 preferably utilizes a data storage structure for storing environment indicators according to, for example, date and time taken and the type of environmental measurement device received from. Each environment indicator received at computer system 10 is preferably analyzed by environment indicator analyzer 42 to provide an analysis of the most recently received environment indicator and update an analysis of a portion of the environment. In addition, environment indicator analyzer 42 is preferably enabled to perform a variety of analysis including, but not limited to, a comprehensive overview of the environment according to all the environment indicators received, an overview of the environment according to environment indicators received over a particular period of time, and an overview of the environment according to the environmental measurement device utilized.

Environmental indicators received at computer system 10 may be filtered according to particular categories of environmental indicators and according to particular time period prior to storage in environmental indicators storage 44 of personal storage device 40 such that a selection of types of environmental indicators are logged at computer system 10 over a particular time period. For example, filters may be designated such that only environmental indicators that measure temperature and humidity for the next two days are stored. Environmental indicators logged in environmental indicator storage 44 of personal storage device 40 provide an environmental exposure history for a particular human, animal, machine or controlled environment that may be transmitted to other data processing systems for further analysis. For example, environmental exposure history for a user may be transmitted to a physician's computer in order for the physician to aid the physician in a diagnosis for the user.

In addition to receiving environment indicators from environmental measurement devices 60a–60n, a user may input environment indicators into computer system 10 via an input interface 54 including, but not limited to, a keyboard, a mouse, a stylus, and a vocal recognition system. For example, a user may measure a water level with a ruler and enter the measurement into computer system 10 rather than utilizing an electronic environmental measurement device that detects and computes a water level. In addition, a user may input environment indicators into computer system 10 that are detected and computed by an environmental measurement device that is not enabled to transmit environment indicators. Measurements entered by a user via input interface 54 are preferably automatically stored in environmental indicator storage 44 of personal storage device 40.

Environment profile 48 includes environmental sensitivity profiles of environment related and non-environment related data for a person, machine, animal or other object. For example, a person's birthday, height, physical disabilities, injuries, doctors information, allergies, health restrictions and other relevant data may be provided. For machines, animals and other objects, environmental sensitivities such as temperature requirements, water requirements, and air requirements may be included. Environment indicator analyzer 42 may utilize data for a person, machine, animal or groups of people, machines and animals, in analyzing environmental indicators. For example, if several environmental measurement devices measure allergens in the air, such as molds and multiple types of pollen, the allergen measurements would be analyzed in view of a person's allergies and warnings recommended to the person if the allergen levels exceed those tolerable by the person. In another example, water depth measurements and wind measurements might be analyzed for a particular boat in view of the water depth requirement and wind endurance specified in the boat's environment profile.

In addition, environment profile 48 may include multiple types of security methods and filters designating multiple levels of security for data stored on personal storage device 40. For example, the user may indicate that certain parts of environment profile 48, such as the user's physical disabilities are to be shielded from transmittal and access unless a password is supplied. In another example, the user may indicate that only certain types of environment indicator measurements are transmittable to and/or accessible by an outside source via a network connection.

Environment indicator reference 46 preferably comprises reference data for each of the types of environment indicators measured by environmental measurement devices 60a–60n. Data-within environment indicator reference 46 can preferably be accessed by computer system 10 according to the environmental measurement device or type of environment indicator. In addition, environment indicator analyzer 42 may utilize data provided in environment indicator reference 46 in analysis and may include or point to data in environment indicator reference 46 in analysis reports provided to the user or to a system. Data stored within environment indicator reference 46 may be downloaded and updated.

Analysis performed by environment indicator analyzer 42 is preferably output to the user via output interface 55 according to output preferences set by the user in environment profile 48. The user-designated output preferences may designate output to multiple types of peripherals accessible to computer system 10. Examples 5 of peripherals include, but are not limited to a graphical display, an electronic paper, an audio speaker, audio headphones, a tactile detectable device, or a printer. In particular, the user may select and provide the type of output device and may upgrade the type of output device as technology advances. The output preferences may include, but are not limited to specifications such as the size, type and coloring of a font in a graphical display, the type of tactile-detectable output (e.g. Braille), the language or the metric amount displayed.

For a graphical display, the user can preferably select from and switch between multiple types of data presentations. For example, the user may select to view of chart or graph of the analyzed data. Alternatively, the user may select to view a spreadsheet representation of the analysis. As previously described, presentation of the data may include data from environment indicator reference 46 or may provide a selectable link to particular data within environment indicator reference 46. Additional types of data presentations which are not described here may also be utilized for displaying the analyzed data from environment indicator analyzer 42.

In response to analysis performed by environment indicator analyzer 42, a control signal determined by environment controller 52 may be output to environmental control systems 56a–56n from computer systems 10 to request adjustment to the environment as controlled by those systems. Environment controller 52 may transmit the control signal to controls systems 56a–56n wherein each of control systems 56a–56n negotiates between conflicting requests and adjusts control of the environment. Alternatively, control signals received at each of control systems 56a–56n may be transmitted to computer system 10, such that environment controller 52 negotiates between conflicting requests and transmits a negotiated control signal to each of control systems 56a–56n.

For example, in the case where a new server system is moved into a particular office and an environment profile for the new server system is retrieved at computer system 10 from a personal storage device proffered on behalf of the new server system, the current temperature detected for the particular office would be analyzed in view of the environment profile for the new server system by indicator analyzer 42. If analysis determines that the new server system is expected to add a particular amount of heat to the ambient air in the office and requires a particular ambient air temperature and humidity according to the environment profile, then environment controller 52 would determine a control signal for the air conditioning control system and humidifier controlling the ambient air temperature of the particular office. In response to receiving the control signals, the air conditioning control system and humidifier controller would adjust output accordingly to meet the environment sensitivity needs of the new server system.

In the same case, a server technician enters the particular office and an environment profile for the server technician is retrieved at computer system 10 from a personal storage device proffered by the server technician. The server technician is estimated to add a particular heat to the ambient temperature of the particular office while working on the new server system. Environment controller 52 would determine new control signals for the air conditioning control system and humidifier controller to control the ambient air temperature of the particular office. In response to receiving the new control signals, the air conditioning control system and humidifier controller would adjust output accordingly to meet the environment sensitivity needs of the new server system in view of the heat added by the server technician. When the server technician is done working, the server technician would remove his personal storage device or request to be removed from the computer system 10, which would cause the current environment indicators received at computer system 10 to be re-analyzed and new control signals to be determined.

In the same case, the server technician also has a health condition included in his environment profile that requires that he not stay in constrained environments with a temperature below 80°. However, the ambient air temperature for the new server system is required by the environment profile not to raise above 70°. In this case, environment controller 52 would attempt to reconcile multiple environment profile sensitivity constraints, however the constraints can not be reconciled. Therefore, an alert would be provided by computer system 10 that the server technician has entered an environment that is limited by temperature constraints. The server technician may, for example, override the temperature constraint within his environment profile or override the temperature constraint within the environment profile for the machine temporarily while he is working. Alternatively, the server technician may not be given the option to override his environment profile constraints or that of the server.

Measurement scheduler 50 provides control of preset scheduling of when particular types of environmental measurements need to be taken and controls whether or not the computer system is to automatically transmit the environment indicator measurements to a particular server or data storage medium. The types of environmental measurements which need to be taken from a portion of the environment and the time frame in which the measurements need to be taken, as indicated by a user or a predetermined measurement schedule, is preferably stored with measurement scheduler 50. Scheduling data from a predetermined measurement schedule may be downloaded from an alternate system such as server 58, onto computer system 10 and stored in measurement scheduler 50. For example, a predetermined measurement schedule may designate that a measurement of the carbon dioxide in "Building 20" needs to be measured every two hours. In response to the designated schedule, in one example, as directed by measurement scheduler 50, computer system 10 may request communication with a carbon dioxide measurement device for "Building 20" every two hours and remotely receive an indicator measurement of the carbon dioxide levels for "Building 20". In another example, an operator may be required to control measurement taking and acquisition of the measurement.

For each scheduled measurement, measurement scheduler 50 preferably provides a reminder or series of reminders. For example, a user may be reminded at 7 AM that a measurement needs to be taken. If a measurement has not been received by 9 AM, the user may be reminded that the grace period for taking a measurement has expired. Measurement scheduler 50 may also provide a schedule to the user or system of when and what measurements need to be taken each day and indicate to the user when the measurement has been received. In particular, if a measurement is not received at all, or is delayed, a record of the lack of receipt or delay may be added to environment indicator storage 44. A user may access environment indicator storage 44 in order to view the measurements taken for an environment and to monitor the timeliness of the measurements received.

Environment account 43 preferably includes account information for a user, company or machine, such as, but not limited to, a pre-paid balance, a credit card number, or checking number. In one embodiment of the present invention, for each use of environmental measurement devices 60a–60n detected at computer system 10, the environment account 43 of personal storage device 40 is charged. In another example, environment account 43 may be charged for use of computer system 10. Alternatively, environment account 43 may be charged for the amount of time a particular environmental control system is controlled according to an environment profile.

Personal storage device 40 is advantageously a smart card, a Java™-enabled ibutton microprocessor (Java™ is a trademark of Sun Microsystems, Inc.) or other personal storage device that is easily transportable. In addition, personal storage device 40 is customizable to a user's preferences and storage/encryption needs. For example, a user may select a personal storage device with a large storage medium or a small storage medium. Moreover, personal storage device 40 may include additional applications, such as java applets that are transmitted to computer system 10 and executed therein or are executed on personal storage device 40. Such applications may provide, for example, a user interface for entering data to be stored in environment profile 48.

It is important to note that personal storage device adapter 38 may be enabled to read from and write to multiple types of personal storage devices, or only a single type of personal storage device. For example, a smart card reader/writer reads from and writes to smart cards. In another example, an ibutton receptor reads from and writes to a java ring or other ibutton based personal storage device. However, a reader/writer may combine both functions of the smart card reader/writer and the ibutton receptor. In addition, advantageously, personal storage device readers/writer can detect and transmit wireless transmissions, such as an RF transmissions, with the personal storage device. In addition, personal storage device readers/writers can detect and transmit data transmissions through contact with the personal storage device.

Moreover, it is important to note that personal storage device 40 is preferably proffered by a user by multiple personal storage device adapters that have is access to multiple computer systems, such that environment indicators can be retrieved and stored on personal storage device 40 from multiple types of computer systems that monitor multiple types of environmental measurement devices. In addition, it is important to note that a single personal storage device adapter 38 may access multiple personal storage devices and in particular multiple environment profiles from multiple personal storage devices, wherein applications executing on computer system 10 may utilize the multiple environment profiles in analyzing environment indicators and determining control signals for transmittal to environmental control systems 56a–56n.

Furthermore, personal storage device 40 may be proffered by a particular user with an environment profile stored on personal storage device 40 for that particular user. Alternatively, in the case of a machine, animal, or other object, personal storage device 40 may be proffered by a particular user on behalf of the machine, animal, or other object with an environment profile stored on the personal storage device for that machine, animal or other object. In addition, in being associated with a particular environment, a user may, for example, be present in the particular environment, may temporarily leave the particular environment, or may be within a particular proximity of the environment.

Referring now to FIG. 3, there is depicted a block diagram of a data storage structure for the environment indicator storage in accordance with the method, system and program of the present invention. As depicted, a data storage structure 70 comprises multiple categorized entries. Environmental indicators and other data from multiple types of environmental measurement devices may be stored in data storage structure 70 as a translated data file in the common transmittable data format, such as the XML data format. While one type of data storage structure is depicted, in alternate embodiments, alternate types of data storage structures may be utilized. Moreover, while particular categories are designated and depicted in data storage structure 70, additional and alternate categories may be designated and depicted in data storage structure 70 in alternate embodiments of the present invention.

A first category indicated at reference numeral 72 includes environment indicator measurements. Next, a second category indicated at reference numeral 74 designates the date and time that the indicator measurement was taken. Thereafter, a third category indicated at reference numeral 76 includes the s measurement unit. Moreover, a category depicted at reference numeral 77 designates the environment zone from which the measurement was received. In the example provided, multiple entries are provided in each category as depicted at reference numeral 78. For example, on "11/20/2000" at "06:10:20" a second-hand smoke reading was received where 30 particles/cubic inch were detected in "Building 30". Later, on "11/13/2000" at "07:15:12" a second-hand smoke reading was received where 200 particles/cubic inch were detected in "Building 30".

With reference now to FIG. 4, there is illustrated a block diagram of a data storage structure for the measurement scheduler in accordance with the method, system and program of the present invention. As depicted, a data storage structure 80 comprises multiple categorized entries. Measurement scheduling for multiple types of environmental measurement devices may be stored in data storage structure 80 as a data file in the common transmittable data format, such as the XML data format. While one type of data storage structure is illustrated, in alternate embodiments, alternate types of data storage structures may be utilized. In addition, while particular categories are designated and depicted in data storage structure 80, additional and alternate categories may be designated and depicted in data storage structure 80 in alternate embodiments of the present invention.

A first category depicted at reference numeral 82 includes the type of measurement to take. Next, a second category illustrated at reference numeral 84 designates the date and time to take the measurement. Thereafter, a third category depicted at reference numeral 86 includes the range of time. Moreover, a fourth category illustrated at reference numeral 87 designates a server destination for automatic transmissions. Next, a fifth category depicted at reference numeral 89 includes the environmental zone from which the measurement. In the example provided, multiple entries are provided in each category as depicted at reference numeral 88. For example, carbon monoxide readings are scheduled to be taken on "11/18/2000" from "Lake X" between at "10:00:00" with a range of "00:05:00" flexibility in receiving the measurement. When the carbon monoxide indicator is received, the measurement is to be automatically transmitted to "Server A".

Referring now to FIG. 5, there is depicted a block diagram of a data storage structure for environment profiles in accordance with the method, system and program of the present embodiment. As illustrated a data storage structure 90 comprises multiple categorized entries. Environment profiles for multiple users and environmentally sensitive devices may be stored in data storage structure 90. While one type of data storage structure is illustrated, in alternate embodiments, alternate types of data storage structures may be utilized. Moreover, while particular categories are designated and depicted in data storage structure 90, additional and alternate categories may be designated and depicted in data storage structure 90 in alternate embodiments of the present invention.

A first category depicted at reference numeral 92 includes the userID. Next, a second category illustrated at reference numeral 93 designates the password for the userID. Thereafter, a third category depicted at reference numeral 94 includes multiple additional categories such as birth date, allergies, etc. Next, a fourth category illustrated at reference numeral 95 includes health restrictions and a fifth category depicted at reference numeral 96 includes output preferences. Alternatively, a category illustrated at reference numeral 97 includes environmentally sensitive devices, a category depicted at reference numeral 98 includes environmental sensitivities of the environmentally sensitive devices and a category illustrated at reference numeral 99 includes the environmental zones where the environmentally sensitive devices are located. In analysis of environmental indicators, a selection of users and environmentally sensitive devices may be incorporated where the selection of users and environmentally sensitive devices are within a designated portion of the environment.

In the example depicted, a person with a userID "GeorgeG" has a health restriction of not being in an environment where smoke levels are greater than 30 particles/cubic inch because of a health condition. Therefore, if smoke level in an environment where GeorgeG is currently or is planning on going is greater than 30 particles/cubic inch, then GeorgeG is preferably alerted upon analysis of the smoke level indicator measurement received at the computer system. In addition, particular instructions may be provided in response to the analysis if the smoke level indicator measurement is greater than 30 particles/cubic inch. Moreover, if an environmental control system, such as an air conditioning/ventilation system, is available which can adjust the environment to reduce the smoke levels, the computer system preferably transmits a control signal to that control system requesting an adjustment to the environment.

The user profile for "GeorgeG" is easily is transmittable in an XML data file as illustrated below where the machine ID and location of portable computer system 10 in latitude, longitude and elevation, as detected by a GPS, is included with the environmental sensitivity profile.

<TimeStamp>888965153</TimeStamp>
<LatLon>36.58, −121.85</LatLon>
<Elevation>77</Elevation>
<MachineID>123456</MachineID>
<UserID>GeorgeG</UserID>
<SmokeMax>30</SmokeMax>

Figure 6:
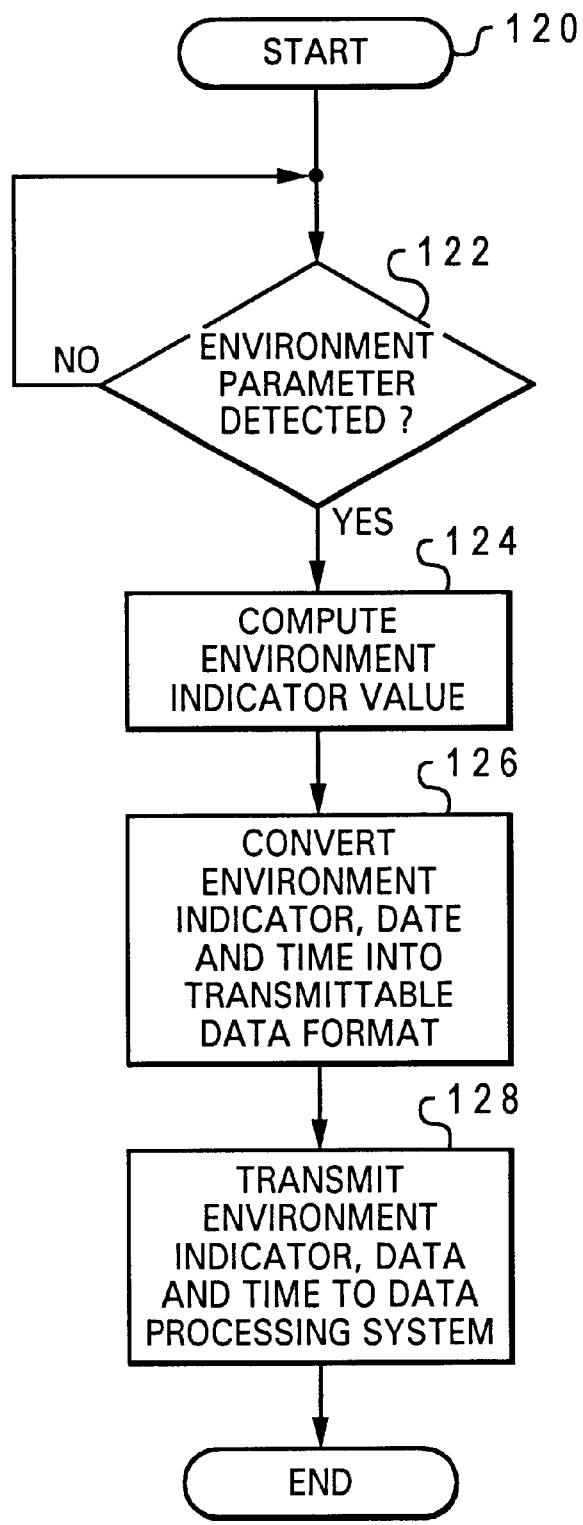
FIG. 6 illustrates a high level logic flowchart of a process and program and program function for transmitting environment indicators to a personal environment indicator monitoring system in accordance with the method, system and program of the present invention.

With reference now to FIG. 6, there is illustrated a high level logic flowchart of a process and program for transmitting environment indicators to a personal environment indicator monitoring system in accordance with the method, system and program of the present invention. As depicted, the process starts at block 120 and thereafter proceeds to block 122. Block 122 illustrates a determination as to whether or not a environment parameter is detected. Each environmental measurement device will detect different types of environment parameters. For example, a water level device will detect a water level for a particular body of water, while a smoke detector will detect a smoke level in a particular enclosed area. If an environment parameter is not detected, the process iterates at block 122. If a environment parameter is detected, the process passes to block 124. Block 124 depicts computing a environment indicator value. Thereafter, block 126 illustrates converting the environment indicator and date and time of receipt into a common transmittable data format. Next, block 128 depicts transmitting the environment indicator and data and time of receipt to a personal environment monitor and the process ends.

Figure 7:
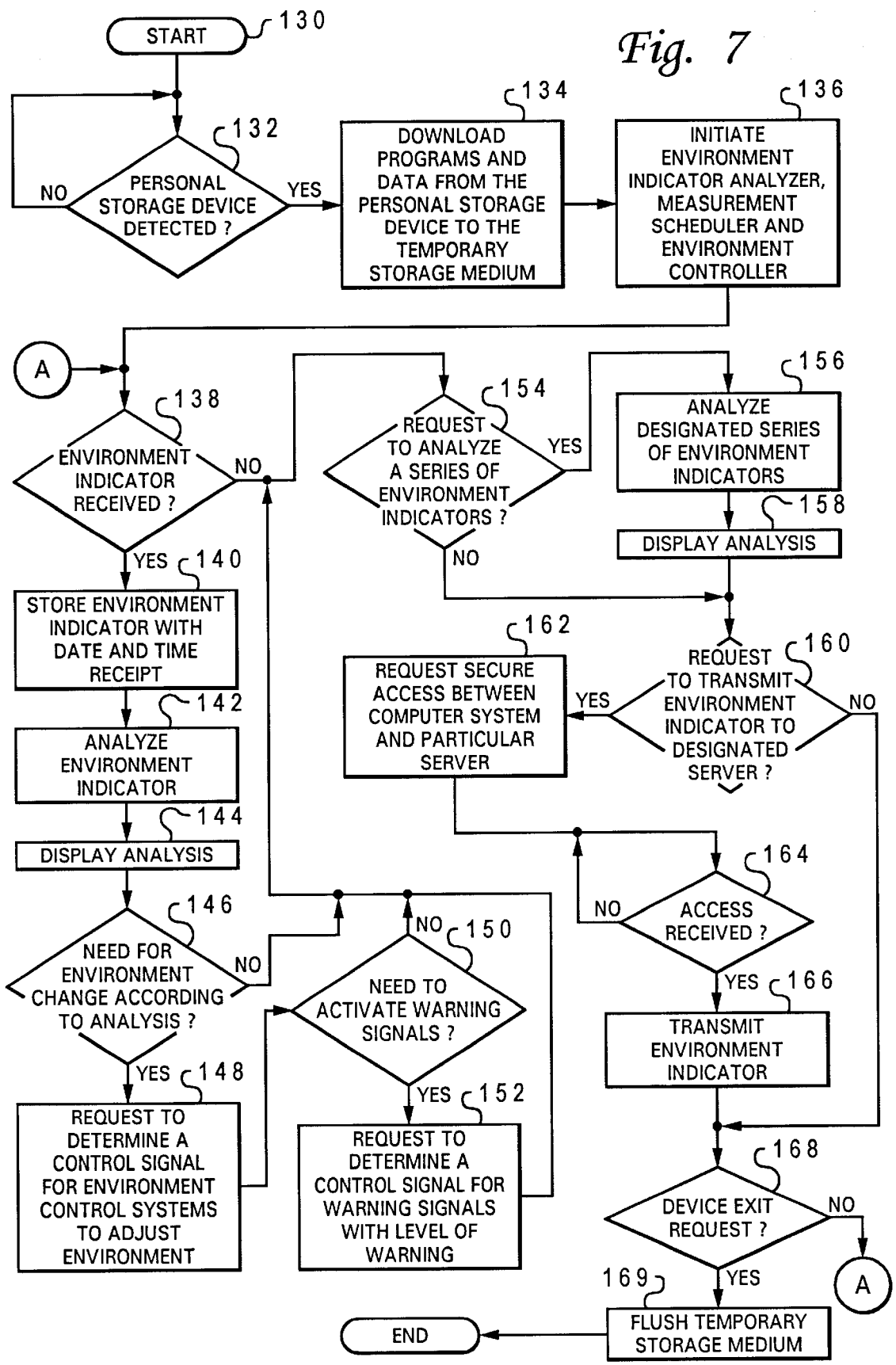
FIG. 7 depicts a high level logic flowchart of a process and program for processing environment indicators received at a personal environment monitor in accordance with the method, system and program of the-present invention.

Referring now to FIG. 7, there is depicted a high level logic flowchart of a process and program for processing environment indicators received at a personal environment monitor in accordance with the method, system and program of the present invention. As illustrated, the process starts at block 130 and thereafter proceeds to block 132. Block 132 depicts a determination as to whether or not a personal storage device is detected. If a personal storage device is not detected, then the process iterates at block 132. If a personal storage device is detected, then the process passes to block 134. Block 134 illustrates downloading programs and data from the personal storage device to the temporary storage medium of a computer system. Thereafter, block 136 depicts initiating the environment indicator analyzer, measurement scheduler and environment controller and the process passes to block 138.

Block 138 depicts a determination as to whether or not an environment indicator is received. If an environment indicator is not received, the process passes to block 154. If an environment indicator is received, the process passes to block 140. Block 140 illustrates storing the environment indicator with data and time receipt at the personal storage device. Thereafter, block 142 depicts analyzing the received environment indicator. In particular, in analyzing the received environment indicator, past analysis and current environment profiles are utilized. Next, block 144 illustrates displaying the analysis and the process passes to block 146. In particular, the analysis may also be output to the output interface which may comprise multiple types of output devices. In addition, the analysis is preferably displayed according to any user output preferences stored in the environment profile.

Block 146 depicts a determination as to whether or not there is a need for an environmental change according to the analysis. For example, if humidity levels are detected at 50% and for a particular machine for which humidity levels should remain less than 50%, a need for adjustment to the environment would be detected during analysis. If there is not a need for an environmental change, the process passes to block 154. If there is a need for an environmental change, the process passes to block 148. Block 148 illustrates requesting to determine a control signal for environmental control systems to adjust the environment. In the example of the humidity levels, a control signal would be requested to be determined by the computer system for requesting a dehumidifier to decrease the humidity levels. Thereafter, block 150 depicts a determination as to whether or not there is a need to activate warning signals according to the analysis. If there is not a need to activate warning signals, the process passes to block 154. If there is a need to activate warning signals, the process passes to block 152. Block 152 illustrates requesting to determine a control signal for warning signals, such as an alarm, with the level of warning and the process passes to block 154.

Block 154 depicts a determination as to whether or not a request to analyze a series of environment indicators is received. In particular a request may be made to analyze a series of environment indicators according to a time period, date, indicator type, etc as designated by the user. If a request to analyze a series of environment indicators is not made, the process passes to block 160. If a request to analyze a series of environment indicators is made, the process passes to block 156. Block 156 illustrates analyzing the designated series of environment indicators according to indicated criteria. Thereafter, block 158 depicts displaying the analysis and the process passes to block 160.

Block 160 depicts a determination as to whether or not a request to transmit an environment indicator(s) to a designated server is made. If a request to transmit an environment indicator is not made, the process passes to block 168. If a request to transmit a environment indicator is made, the process passes to block 162. Block 162 illustrates requesting secure access between the computer system and the designated server. Next, block 164 depicts a determination as to whether or not secure access is received. If secure access is not received, the process iterates for a particular time at block 164. If secure access is received, the process passes to block 166. Block 166 illustrates transmitting the environment indicator(s) and the process passes to block 168.

Block 168 depicts a determination as to whether or not a device exit request has been received. In particular, data from personal storage device may be received via a wireless RF transmission between a personal storage device adapter and a personal storage device. In this case, the user would indicate to exit the applications. Alternatively, other personal storage device adapters receive personal storage devices and read from the personal storage device from contact with the device. In this case, the user would request the device in order to exit. If a device exit request has not been received, then the process passes to block 138. If a device exit request has been received, then the process passes to block 169. Block 169 illustrates flushing the temporary storage medium and the process ends.

Figure 8:
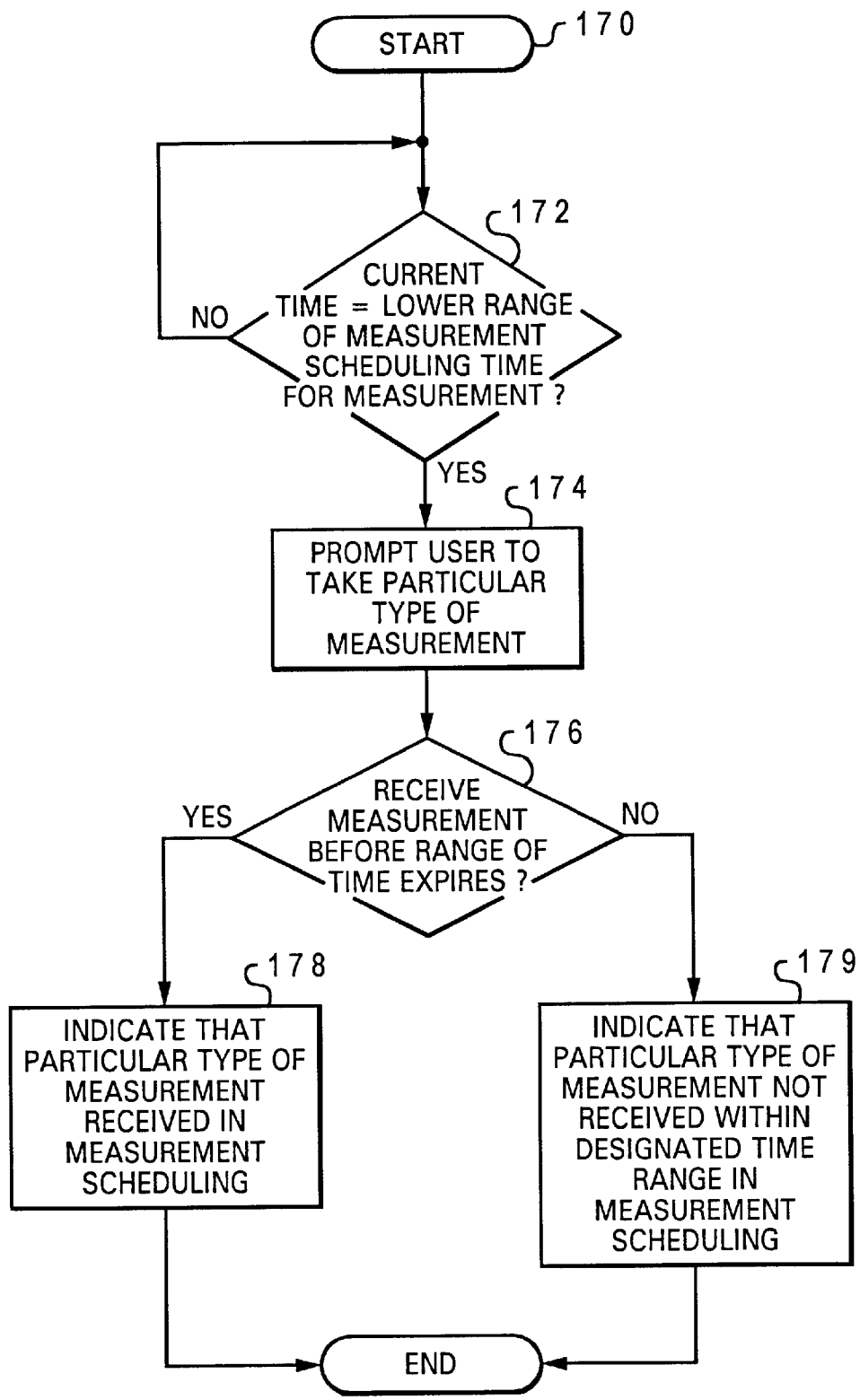
FIG. 8 illustrates a high level logic flowchart of a process and program.for monitoring receipt of environment indicators in accordance with the method, system and program of the present invention.

With reference now to FIG. 8, there is illustrated a high level logic flowchart of a process and program for monitoring receipt of environment indicators in accordance with the method, system and program of the present invention. As depicted, the process starts at block 170 and thereafter proceeds to block 172. Block 172 illustrates a determination as to whether or not the current time is equal to the lower range of a measurement scheduling time. If the current time is not equal to the lower range of a measurement scheduling time, the process iterates at block 172. If the current time is equal to the lower range of a measurement scheduling time, the process passes to block 174. Block 174 depicts prompting the user to take a particular type of measurement or the computer system to request access to a particular type of measurement according to the measurement type scheduled for the measurement scheduling time. Thereafter, block 176 illustrates a determination as to whether or not the environment indicator measurement is received before the range of time scheduled for the measurement expires. If the measurement is received before the range of time expires, the process passes to block 178. Block 178 depicts indicating that the particular type-of measurement is received in the measurement scheduling record on the personal storage device and the process ends. If the measurement is not received before the range of time scheduled for the measurement expires, the process passes to block 179. Block 179 illustrates indicating that the particular type of measurement was not received within the designated range of time in the measurement scheduling record on the personal storage device and the process ends.

Figure 9:
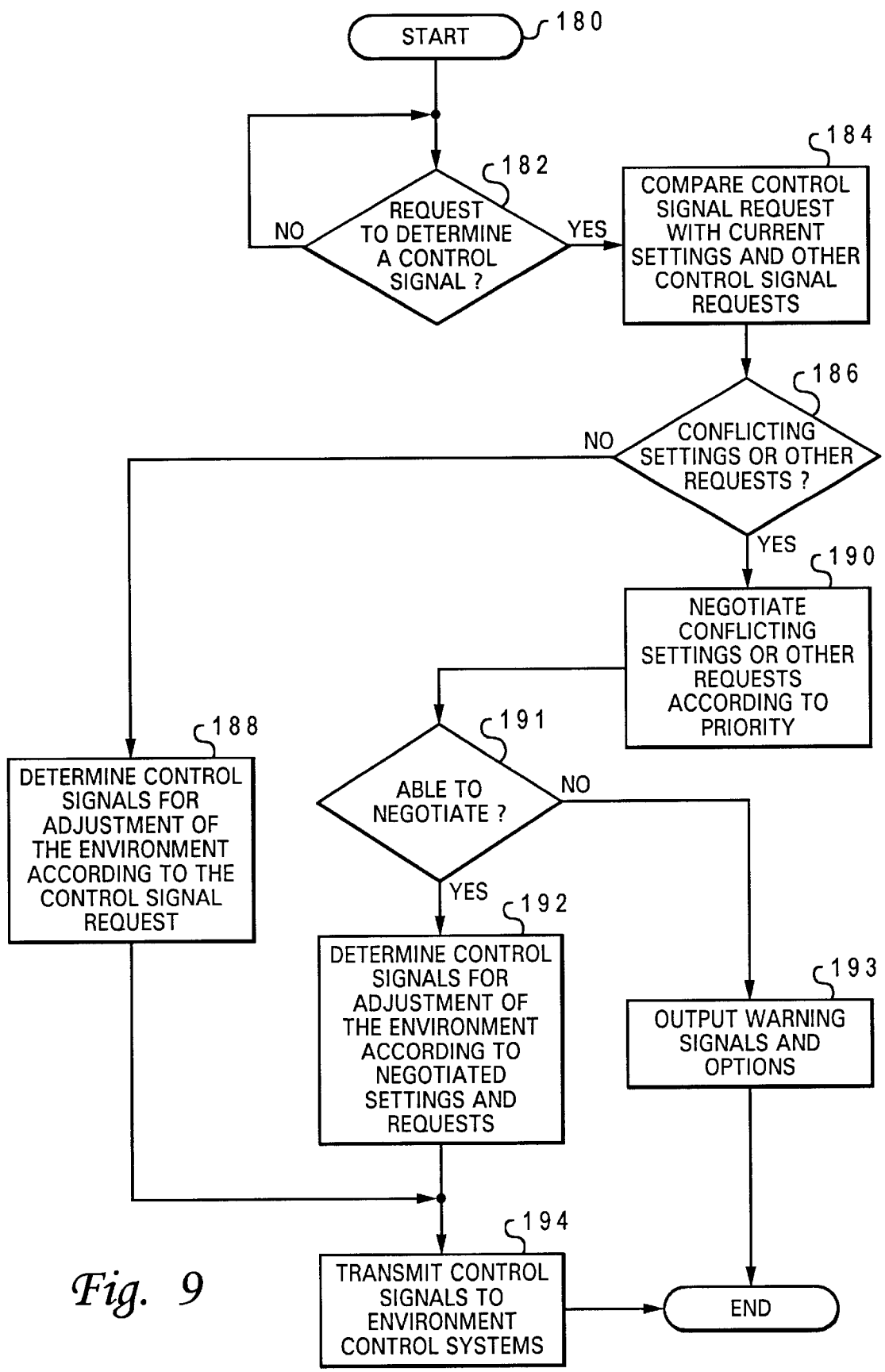
FIG. 9 depicts a high level logic flowchart of a process and program for adjusting a controlled environment in accordance with the method, system and program of the present invention.

Referring now to FIG. 9, there is depicted a high level logic flowchart of a process and program for adjusting a controlled environment in accordance with the method, system and program of the present invention. As illustrated, the process starts at block 180 and thereafter proceeds to block 182. Block 182 depicts a determination as to whether or not a request to determine a control signal is received. If a request to determine a control signal is not received, then the process iterates at block 182. If a request to determine a control signal is received, then the process passes to block 184. Block 184 illustrates comparing the control signal request with current settings and other control signal requests other control signal requests may be received at the environmental control system from alternate computer systems or from alternate personal storage devices. Thereafter, block 186 depicts a determination as to whether or not there are conflicting settings or other requests. If there are not conflicting settings or other requests, then the process passes to block 188.

Block 188 illustrates determining control signals for adjustment of the environment according to the control signal request and the process passes to block 194. If there is a conflicting setting or other request, then the process passes to block 190. Block 190 depicts negotiating the conflicting settings or other requests according to priority and the process passes to block 191. For example, settings for the environmental control system may be given a priority where only requests from a particular user or from a particular environmentally sensitive system will override the settings. In an alternate example, settings for the environmental control system may comprise a default that is utilized when there are not requests from computer systems. In the case where there are requests from other computer systems, priority may be given according to an ordering scheme, such as adjusting the environment in order of the received request. Block 191 illustrates a determination as to whether or not the conflicting settings and other requests are negotiable. If the conflicting settings and other requests are not negotiable, then the process passes to block 193. Block 193 depicts outputting warning signals and options according to the conflicting requests and settings and the process ends. If the conflicting settings and other requests are negotiable, then the process passes to block 192. Block 192 illustrates determining control signals for adjustment of the environment according to the negotiated settings and requests. Thereafter, block 194 depicts transmitting the determined control signals to the environmental control systems and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing an environment, said method comprising the steps of:

converting a plurality of environment indicators computed for a particular environment from among a plurality of environments into a transmittable data format, wherein each of said plurality of environment indicators is computed by an electronic environmental measurement device from among a plurality of diverse electronic environmental measurement devices; and transmitting said plurality of environment indicators in said transmittable data format to a temporary data storage medium of a data processing system, wherein said data processing system has access to a personal storage device proffered by a particular user;

retrieving from said personal storage device into said temporary data storage medium an environment sensitivity profile of said particular user's sensitivities to environment as indicated by said environment indicators for said particular user associated with said particular environment;

retrieving from said personal storage device into said temporary data storage medium an environment indicator analyzer application that when executed analyzes said plurality of environment indicators received at said data processing system according to said particular environment and said environmental sensitivity profile and determines a plurality of control signals for adjusting a plurality of environmental control systems that control said particular environment; and adjusting said plurality of environmental control systems according to said plurality of control signals determined by said environment indicator analyzer application executing on said data processing system, such that said particular environment is managed according to said environment sensitivity profile retrieved from said personal storage device for said particular user associated with said particular environment.

2. The method for managing an environment according to claim 1, said method further comprising the step of:

outputting results from said analysis according to user output preferences retrieved from said personal storage device.

3. The method for managing an environment according to claim 1, said method further comprising the step of:

storing said plurality of environment indicators on said personal storage device.

4. The method for managing an environment according to claim 1, said method further comprising the step of:

downloading data onto said personal storage device, wherein said downloaded data is utilized by said environment indicator analyzer application for said analysis of said plurality of environment indicators and said determination of said plurality of control signals.

5. The method for managing an environment according to claim 1, wherein executing said environment indicator analyzer application further comprises the step of:

analyzing said plurality of physical environment indicators according to an environment indicator reference retrieved from said personal storage device.

6. The method for managing an environment according to claim 1, wherein said step of receiving from said personal storage device into said temporary data storage medium an environment sensitivity profile for said particular user within said particular environment further comprises the step of:

receiving from said personal storage device into said temporary data storage medium an environment sensitivity profile for said particular user, wherein said personal storage device is proffered by a holder on behalf of said particular user.

7. The method for managing an environment according to claim 1, wherein said step of receiving from said personal storage device into said temporary data storage medium an environment sensitivity profile for said particular user within said particular environment further comprises the step of:

receiving from a plurality of personal storage devices into said temporary data storage medium a plurality of environment sensitivity profiles for a plurality of users.

8. The method for managing an environment according to claim 1, said method further comprising the step of:

retrieving from said personal storage device into said temporary data storage medium a designated time period during which a particular environment indicator is expected to be received at said data processing system from a particular environmental measurement device.

9. The method for managing an environment according to claim 1, said method further comprising the steps of:

requesting a secure communication medium access from said data processing system to a particular server indicated by data stored in said personal storage device; and in response to receiving a secure communication medium access to said particular server, transmitting said plurality of environment indicators to said particular server.

10. The method for managing an environment according to claim 1, said method further comprising the step of:

in response to receiving a plurality of environment indicators at said data processing system, debiting an environment account stored on said personal storage device.

11. A system for managing an environment, said system comprising:

means for converting a plurality of environment indicators computed for a particular environment from among a plurality of environments into a transmittable data format, wherein each of said plurality of environment indicators is computed by an electronic environmental measurement device from among a plurality of diverse electronic environmental measurement devices;

means for transmitting said plurality of environment indicators in said transmittable data format to a temporary data storage medium of a data processing system, wherein said data processing system has access to a personal storage device proffered by a particular user;

means for retrieving from said personal storage device into said temporary data storage medium an environment sensitivity profile of said particular user's sensitivities to environment as indicated by said environment indicators for said particular user associated with said particular environment;

means for retrieving from said personal storage device into said temporary data storage medium an environment indicator analyzer application that when executed analyzes said plurality of environment indicators received at said data processing system according to said particular environment and said environmental sensitivity profile and determines a plurality of control signals for adjusting a plurality of environmental control systems that control said particular environment; and means for adjusting said plurality of environmental control systems according to said plurality of control signals determined by said environment indicator analyzer application executing on said data processing system, such that said particular environment is managed according to said environment sensitivity profile retrieved from said personal storage device for said particular user associated with said particular environment.

12. The system for managing an environment according to claim 11, said system further comprising:
means for outputting results from said analysis according to user output preferences retrieved from said personal storage device.

13. The system for managing an environment according to claim 11, said system further comprising:
means for storing said plurality of environment indicators on said personal storage device.

14. The system for managing an environment according to claim 11, said system further comprising:
means for downloading data onto said personal storage device, wherein said downloaded data is utilized by said environment indicator analyzer application for said analysis of said plurality of environment indicators and said determination of said plurality of control signals.

15. The system for managing an environment according to claim 11, said system further comprising:
means for analyzing said plurality of environment indicators according to an environment profile stored on said data processing system, wherein said environment profile comprises environmental sensitivities for said a plurality of users within said particular environment.

16. The system for managing an environment according to claim 11, said system further comprising:
means for analyzing said plurality of physical environment indicators according to an environment indicator reference retrieved from said personal storage device.

17. The system for managing an environment according to claim 11, wherein said means for receiving from said personal storage device into said temporary data storage medium an environment sensitivity profile for said particular user within said particular environment further comprises:
means for receiving from said personal storage device into said temporary data storage medium an environment sensitivity profile for said particular user, wherein said personal storage device is proffered by a holder on behalf of said particular user.

18. The system for managing an environment according to claim 11, wherein said means for receiving from said personal storage device into said temporary data storage medium an environment sensitivity profile for said particular user within said particular environment further comprises:
means for receiving from a plurality of personal storage devices into said temporary data storage medium a plurality of environment sensitivity profiles for a plurality of users.

19. The system for managing an environment according to claim 11, said system further comprising:
means for retrieving from said personal storage device into said temporary data storage medium a designated time period during which a particular environment indicator is expected to be received at said data processing system from a particular environmental measurement device.

20. The system for managing an environment according to claim 11, said system further comprising:
means for requesting a secure communication medium access from said data processing system to a particular server indicated by data stored in said personal storage device; and
means for transmitting said plurality of environment indicators to said particular server, in response to receiving a secure communication medium access to said particular server.

21. The system for managing an environment according to claim 11, said means for analyzing and storing each of said plurality of environment indicators at said data processing system, further comprising:
means for debiting an environment account stored on said personal storage device, in response to receiving a plurality of environment indicators at said data processing system.

22. The system for managing an environment according to claim 11, said means for retrieving from said personal storage device further comprising:
a personal storage device adapter coupled to said data processing system via a communication medium.

23. The system for managing an environment according to claim 22, wherein said personal storage device adapter reads data from and writes data to said personal storage device via a wireless communication medium.

24. The system for managing an environment according to claim 22, wherein said personal storage device further comprises:
a processor; and
a data storage medium coupled to said processor.

25. A program, residing on a computer usable medium having computer readable program code means, said program comprising:
means for retrieving into a temporary data storage medium of a data processing system a plurality of environment indicators computed for a particular environment from among a plurality of environments, wherein each of said plurality of environment indicators is computed by an electronic environmental measurement device from among a plurality of diverse electronic environmental measurement devices, wherein said data processing system has access to a personal storage device proffered by a particular user;
means for retrieving from said personal storage device into said temporary data storage medium an environment sensitivity profile of said particular user's sensitivities to environment as indicated by said environment indicators for said particular user within said particular environment;
means for executing an analyzer application that analyzes said plurality of environment indicators received at said data processing system according to said particular environment and said environmental sensitivity profile;
means for executing a controller application that determines a plurality of control signals for adjusting a plurality of environmental control systems that control said particular environment; and
means for outputting said plurality of control signals to said plurality of environmental control systems for adjusting said plurality of environmental control systems according to said plurality of control signals.

26. The program according to claim 25, said program further comprising:
means for outputting results from said analysis according to user output preferences previously stored on said personal storage device.

27. The program according to claim 25, said program further comprising:
   means for storing said plurality of environment indicators on said personal storage device.

28. The program according to claim 25, said program further comprising:
   means for downloading data onto said personal storage device, wherein said downloaded data is utilized for said analysis of said plurality of environment indicators.

29. The program according to claim 25, said program further comprising:
   means for analyzing said plurality of environment indicators according to an environment profile stored on said data processing system, wherein said environment profile comprises environmental sensitivity profiles for a plurality of diverse users within said particular environment.

30. The program according to claim 25, said program further comprising:
   means for analyzing said plurality of physical environment indicators according to a environment indicator reference retrieved from said personal storage device.

31. The program according to claim 25, said program further comprising:
   means for retrieving said analyzer application and said controller application from said personal storage device into said temporary data storage medium.

32. The program according to claim 25, said program further comprising:
   means for designating a time period during which a particular environment indicator is expected to be received at said personal storage device from a particular environmental measurement device.

33. The program according to claim 25, said program further comprising:
   means for requesting a secure communication medium access to a particular server according to a server designation retrieved from said personal storage device; and
   means for transmitting said plurality of environment indicators to said particular server, in response to receiving a secure communication medium access to said particular server.

34. The program according to claim 25, said program further comprising:
   means for debiting an environment account stored at said personal storage device.

35. A method for monitoring the environmental exposure of a particular user, said method comprising the steps of:
   accessing at a computer system a plurality of environmental indicators computed for a particular environment by a plurality of diverse electronic environmental measurement devices and converted into a common transmittable data format; and
   in response to detecting a particular user within a particular proximity of said particular environment, transmitting said plurality of environmental indicators to a personal storage device proffered by said particular user, such that environmental indicators for environments to which said particular user is exposed are automatically stored on said personal storage device.

36. The method for monitoring the environmental exposure of a particular user according to claim 35, said method comprising the step of:
   debiting said personal storage device, in response to transmitting said plurality of environmental indicators to said personal storage device.

37. The method for monitoring the environmental exposure of a particular user according to claim 35, said method comprising the steps of:
   accessing at said computer system an environmental sensitivity profile for a particular user from a personal storage device proffered by said particular user;
   comparing said plurality of environmental indicators for said particular environment with said environmental sensitivity profile for said particular user at said computer system; and
   controlling output of a recommendation of suitability of said particular environment for said particular user, in response to said comparison of said plurality of environmental indicators with said environmental sensitivity profile, such that said particular user receives an indication of whether said particular environment is suitable for said particular user.

38. The method for monitoring the environmental exposure of a particular user according to claim 35, said method further comprising the step of:
   detecting said user by detecting said personal storage device by a personal storage device adapter that detects said personal storage device within a particular range.

39. A system for monitoring the environmental exposure of a particular user, said system comprising:
   means for accessing at a computer system a plurality of environmental indicators computed for a particular environment by a plurality of diverse electronic environmental measurement devices and converted into a common transmittable data format; and
   means for transmitting said plurality of environmental indicators to a personal storage device proffered by said particular user, in response to detecting a particular user within a particular proximity of said particular environment, such that environmental indicators for environments to which said particular user is exposed are automatically stored on said personal storage device.

40. The system for monitoring the environmental exposure of a particular user according to claim 39, said system comprising:
   means for debiting said personal storage device, in response to transmitting said plurality of environmental indicators to said personal storage device.

41. The system for monitoring the environmental exposure of a particular user according to claim 39, said system comprising:
   means for accessing at said computer system an environmental sensitivity profile for a particular user from a personal storage device proffered by said particular user;
   means for comparing said plurality of environmental indicators for said particular environment with said environmental sensitivity profile for said particular user at said computer system; and
   means for controlling output of a recommendation of suitability of said particular environment for said particular user, in response to said comparison of said plurality of environmental indicators with said environmental sensitivity profile, such that said particular user receives an indication of whether said particular environment is suitable for said particular user.

42. A program for monitoring the environmental exposure of a particular user, residing on a computer usable medium having computer readable program code means, said program comprising:

means for accessing at a computer system a plurality of environmental indicators computed for a particular environment by a plurality of diverse electronic environmental measurement devices and converted into a common transmittable data format; and means for transmitting said plurality of environmental indicators to a personal storage device proffered by said particular user, in response to detecting a particular user within a particular proximity of said particular environment, such that environmental indicators for environments to which said particular user is exposed are automatically stored on said personal storage device.

43. A method for managing a controllable environment, said method comprising the steps of:

accessing at a computer system a plurality of environmental indicators computed for a particular environment by a plurality of diverse electronic environmental measurement devices and converted into a common transmittable data format;

accessing at said computer system an environmental sensitivity profile of said particular user's sensitivities to environment as indicated by said environment indicators for a particular user from a personal storage device proffered by said particular user;

comparing said plurality of environmental indicators for said particular environment with an environmental profile for a particular user; and transmitting control signals for adjusting said particular environment from said computer system to a plurality of environment control systems that each control one of a plurality of environmental parameters within said particular environment, in response to said comparison of said plurality of environmental indicators with said environmental sensitivity profile, such that said particular environment is adjusted to be suitable for said particular user.

44. A system for managing a controllable environment, said system comprising:

means for accessing at a computer system a plurality of environmental indicators computed for a particular environment by a plurality of diverse electronic environmental measurement devices and converted into a common transmittable data format;

means for accessing at said computer system an environmental sensitivity profile of said particular user's sensitivities to environment as indicated by said environment indicators for a particular user from a personal storage device proffered by said particular user;

means for comparing said plurality of environmental indicators for said particular environment with an environmental profile for a particular user; and means for transmitting control signals for adjusting said particular environment from said computer system to a plurality of environment control systems that each control one of a plurality of environmental parameters within said particular environment, in response to said comparison of said plurality of environmental indicators with said environmental sensitivity profile, such that said particular environment is adjusted to be suitable for said particular user.

45. A program for managing a controllable environment, residing on a computer usable medium having computer readable program code means, said program comprising:

means for accessing at a computer system a plurality of environmental indicators computed for a particular environment by a plurality of diverse electronic environmental measurement devices and converted into a common transmittable data format;

means for accessing at said computer system an environmental sensitivity profile of said particular user's sensitivities to environment as indicated by said environment indicators for a particular user from a personal storage device proffered by said particular user;

means for comparing said plurality of environmental indicators for said particular environment with an environmental profile for a particular user; and means for transmitting control signals for adjusting said particular environment from said computer system to a plurality of environment control systems that each control one of a plurality of environmental parameters within said particular environment, in response to said comparison of said plurality of environmental indicators with said environmental sensitivity profile, such that said particular environment is adjusted to be suitable for said particular user.

46. A method for managing an environmental control system, said method further comprising the steps of:

receiving at an environmental control system a plurality of environmental sensitivity profiles proffered by a plurality of personal storage devices each respectively associated with one of a plurality of users located within a particular proximity of a particular environment of which a particular parameter is controlled by said environmental control system, wherein said plurality of environmental sensitivity profiles each include requirements for said particular environment parameter;

negotiating conflicts between said plurality of environmental sensitivity profiles and current environmental settings at said environmental control system; and controlling an adjustment of said particular environment parameter of said particular environment by said environmental control system, in response to said negotiation of conflicts between said plurality of controls signals and said current environmental settings, such that said particular environment parameter of said particular environment is adjusted according to requests from said plurality of users.

47. A system for managing an environmental control system, said system further comprising:

means for receiving at an environmental control system a plurality of environmental sensitivity profiles proffered by a plurality of personal storage devices each respectively associated with one of a plurality of users located within a particular proximity of a particular environment of which a particular parameter is controlled by said environmental control system, wherein said plurality of environmental sensitivity profiles each include requirements for said particular environment parameter;

means for negotiating conflicts between said plurality of environmental sensitivity profiles and current environmental settings at said environmental control system; and means for controlling an adjustment of said particular environment parameter of said particular environment by said environmental control system, in response to said negotiation of conflicts between said plurality of controls signals and said current environmental settings, such that said particular environment parameter of said particular environment is adjusted according to requests from said plurality of users.

48. A program for managing an environmental control system, residing on a computer usable medium having computer readable program code means, said program comprising:

means for receiving at an environmental control system a plurality of environmental sensitivity profiles proffered by a plurality of personal storage devices each respectively associated with one of a plurality of users located within a particular proximity of a particular environment of which a particular parameter is controlled by said environmental control system, wherein said plurality of environmental sensitivity profiles each include requirements for said particular environment parameter;

means for negotiating conflicts between said plurality of environmental sensitivity profiles and current environmental settings at said environmental control system; and means for controlling an adjustment of said particular environment parameter of said particular environment by said environmental control system, in response to said negotiation of conflicts between said plurality of controls signals and said current environmental settings, such that said particular environment parameter of said particular environment is adjusted according to requests from said plurality of users.

\* \* \* \* \*